US007111294B2

(12) United States Patent
Steensgaard

(10) Patent No.: US 7,111,294 B2
(45) Date of Patent: Sep. 19, 2006

(54) THREAD-SPECIFIC HEAPS

(75) Inventor: Bjarne Steensgaard, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 760 days.

(21) Appl. No.: 09/761,404

(22) Filed: Jan. 16, 2001

(65) Prior Publication Data

US 2002/0095453 A1    Jul. 18, 2002

(51) Int. Cl.
*G06F 9/46* (2006.01)
*G06F 12/00* (2006.01)

(52) U.S. Cl. .................................. 718/100; 711/100
(58) Field of Classification Search ............ 711/6, 711/1, 100, 117, 147; 718/100, 102, 104–106, 718/1
See application file for complete search history.

(56) References Cited

U.S. PATENT DOCUMENTS

| 5,692,193 | A | * | 11/1997 | Jagannathan et al. | ........ | 718/106 |
| 5,809,554 | A | * | 9/1998 | Benayon et al. | ............ | 711/171 |
| 6,381,738 | B1 | * | 4/2002 | Choi et al. | ................... | 717/140 |
| 6,457,023 | B1 | * | 9/2002 | Pinter et al. | ................. | 707/206 |
| 6,484,247 | B1 | * | 11/2002 | Gendron et al. | ............ | 711/170 |
| 6,505,344 | B1 | * | 1/2003 | Blais et al. | ................... | 717/151 |
| 2002/0133533 | A1 | * | 9/2002 | Czajkowski et al. | ........ | 709/107 |
| 2002/0178437 | A1 | * | 11/2002 | Blais et al. | ................. | 717/140 |

OTHER PUBLICATIONS

Choi et al., "Escape Analysis for Java", IBM T.J. Watson Research Center, Nov. 1, 1999.*
Whaley et al., "Compositional Pointer and Escape Analysis for Java Programs," Laboratory for Computer Science, Massachusetts Institute for Technology (1999).*
"Effective Synchronization Removal for Java", Erik Ruf, Microsoft Research, 11 pgs.
"Polymorphic Type Schemes and Recursive Definitions", Alan Mycroft, *Lecture Notes in Computer Science*, International Symposium on Programming, 13 pgs.
"Region-Based Memory Management", by Tofte and Talpin, 76 pgs.
"Processes in KaffeOS: Isolation, Resource Management, and Sharing in Java", Back, Hsieh & Lepreau, University of Utah, 14 pgs.
"Implementation of the Typed Call-by-Value λ-calculus using a Stack of Regions", Tofte and Talpin, Department of Computer Science, University of Copenhagen, 14 pgs.
"JOVE™ Optimizing Native Compiler for Java", The JOVE System, http://www.instantiations.com/jove/product/thejovesystem.htm, 3 pgs.

(Continued)

*Primary Examiner*—Meng-Al T. An
*Assistant Examiner*—Kenneth Tang
(74) *Attorney, Agent, or Firm*—Merchant & Gould P.C.

(57) ABSTRACT

Thread-specific heaps are employed in multithreaded programs to decrease garbage collection latency in such programs. Program data in a target program is analyzed to identify thread-specific data and shared data. Thread-specific data is identified on the basis that the thread-specific data is determined to be reachable only from a single program thread of the target program. Each program thread can be associated with an individual thread-specific heap. Shared data is identified on the basis that the shared data is potentially reachable from a plurality of program threads of the target program. An exemplary method of identifying such data is referred to as a thread escape analysis. Garbage collection of such heaps may be performed independently or with minimal synchronization. Remembered sets may also be used to increase the independence of collection of individual heaps and to decrease garbage collection latency.

38 Claims, 10 Drawing Sheets

OTHER PUBLICATIONS

"Report on the FX Programming Language", Gifford, Jouvelot, Sheldon and O'Toole, Programming Systems Research Group, Massachusetts Institute of Technology, 46 pgs.

"Hoard: A Scalable Memory Allocator for Multithreaded Applications", Berger, McKinley, Blumofe, Wilson, Departments of Computer Science at Univ of Texas at Austin and University of Massachusetts, 11 pgs.

"Uniprocessor Garbage Collection Techniques", Wilson, 67 pages. Technical Report, Instantiations, Inc., JOVE Super Optimizing Development Environment™ for Java™, JOVE Technical Overview, 20 pgs.

"A concurrent, generational garbage collector for a multithreaded implementation of ML" by Damien Doligez and Xavier Leroy, 11 pgs.

* cited by examiner

THREAD-SPECIFIC HEAPS

TECHNICAL FIELD

The invention relates generally to memory management in a computer system, and more particularly to memory management using thread-specific heaps in a computer system.

BACKGROUND OF THE INVENTION

A computer program can use multiple categories of data storage during execution. Two such data storage categories involve a stack and a heap. The stack is typically an area of memory used for runtime data for methods, such as local variables, method return locations, intermediate results, etc. Alternatively, the heap includes an area of memory reserved for data that is created at runtime, wherein the lifetime of data in a heap typically is not determined by the lifetime of a particular method, whereas the lifetime of data in a stack is limited by the lifetime of the method with which the data is associated. In some approaches, however, a heap may also contain data normally put on the stack.

In addition, during execution, a program may no longer need data that has been allocated in the heap. Therefore, some method is required to reclaim the unneeded memory space from the heap. One method involves explicit program instructions to "free" the unneeded memory.

Another method is called "garbage collection." Garbage collection generally involves reclaiming the heap memory that is no longer being used by the program. Typically, in a multithreaded program, a heap is shared by multiple program threads. A program thread refers to a part of a program that runs somewhat independently of (e.g., non-sequentially with) other parts of the program. Program threads often share some of their environment with other program threads. For example, individual program threads may be distinguished by the value of their program counters and stack pointers. Program threads may also share a single address space and set of global variables.

However, garbage collection of a shared heap in a multithreaded program typically requires that access to the shared heap by other program threads (i.e., other than the garbage collection thread or threads) be suspended until the garbage collection is complete. Alternatively, all other program threads may be synchronized with one or more garbage collection threads to avoid corruption of the heap. Note: In some approaches, a program thread may perform its own garbage collection. Heap corruption can occur, for example, if a program thread allocates a program object to the shared heap during garbage collection by another thread (e.g., a garbage collector thread). For example, because the garbage collector thread lacks needed information about the new program object (e.g., which other program objects the new program object may reference), the garbage collector thread may inappropriately reclaim the memory associated with the new program object. As such, garbage collection in a multithreaded program traditionally requires synchronizing among the program threads or suspending the execution of the program threads during collection to prevent the program threads from arbitrarily modifying the shared heap during collection.

Both program thread-suspension and synchronization (e.g., forms of rendezvous) significantly contribute to garbage collection latency and impair performance of the program during garbage collection. Particularly for server-type applications with several hundred program threads, such garbage collection latency can present significant performance problems.

SUMMARY OF THE INVENTION

Embodiments of the present invention solve the discussed problems by providing thread-specific heaps in a multithreaded program. One characteristic of many multithreaded programs is that much of the allocated memory is visible to only one program thread of the program. Therefore, it is desirable to garbage collect such memory without involving other program threads (e.g., independently of execution or garbage collection of other program threads). As such, an embodiment of the present invention provides thread-specific heaps and thread-specific garbage collection to decrease garbage collection latency in a computer system.

In an implementation of the present invention, a method of managing allocation of program data in a target program between one or more thread-specific heaps and at least one shared heap is provided. The program data includes thread-specific data and shared data. The target program is analyzed to distinguish between the thread-specific data of a first program thread and the shared data. The target program is configured to allocate the thread-specific data of the first program thread to a first thread-specific heap. The target program is also configured to allocate the shared data to the shared heap, responsive to the analyzing operation.

In another implementation of the present invention, a method of managing memory used for program data in a target program having one or more thread-specific heaps and at least one shared heap is provided. The program data includes thread-specific data and shared data. The thread-specific data associated with a first program thread of the target program is allocated to a first thread-specific heap, wherein the thread-specific data is determined to be reachable only by the first thread. The shared data is allocated to the shared heap, wherein the shared data is deemed potentially reachable by multiple program threads of the target program.

In another implementation of the present invention, a compiler for managing allocation of program data of a target program between a shared heap and a thread-specific heap is provided. The program data includes thread-specific data and shared data. A program analyzer analyzes the target program to distinguish between the thread-specific data of a first program thread and the shared data. A code specializer configures the target program to allocate the thread-specific data of the first program thread to a first thread-specific heap. The code specializer also configures the target program to allocate the shared data to the shared heap.

In yet another embodiment of the present invention, a memory manager for managing heap memory in a computer system is provided. The heap memory is used to store program data. The program data includes thread-specific data and shared data. An allocation module allocates thread-specific data associated with a first program thread of the target program to a first thread-specific heap. The thread-specific data is determined to be reachable only by the first thread. The allocation module also allocates the shared data to the shared heap. The shared heap is deemed potentially reachable by multiple program threads of the target program.

In other implementations of the present invention, articles of manufacture are provided as computer program products. One embodiment of a computer program product provides a computer program storage medium readable by a computer system and encoding a computer program for executing a computer process that manages allocation of program data in a target program between one or more thread-specific heaps and at least one shared heap. Another embodiment of a computer program product may be provided in a computer data signal embodied in a carrier wave by a computing system and encoding the computer program that manages allocation of program data in a target program between one or more thread-specific heaps and at least one shared heap.

The computer program product encodes a computer program for executing on a computer system a computer process for managing allocation of program data in a target program between one or more thread-specific heaps and at least one shared heap. The program data includes thread-specific data and shared data. The target program is analyzed to distinguish between the thread-specific data of a first program thread and the shared data. The target program is configured to allocate the thread-specific data of the first program thread to a first thread-specific heap. The target program is also configured to allocate the shared data to the shared heap, responsive to the analyzing operation.

In other implementations of the present invention, articles of manufacture are provided as computer program products. One embodiment of a computer program product provides a computer program storage medium readable by a computer system and encoding a computer program for executing a computer process that manages memory used for program data in a target program having one or more thread-specific heaps and at least one shared heap. Another embodiment of a computer program product may be provided in a computer data signal embodied in a carrier wave by a computing system and encoding the computer program that manages memory used for program data in a target program having one or more thread-specific heaps and at least one shared heap.

The computer program product encodes a computer program for executing on a computer system a computer process for managing memory used for program data in a target program having one or more thread-specific heaps and at least one shared heap. The program data includes thread-specific data and shared data. The thread-specific data associated with a first program thread of the target program is allocated to a first thread-specific heap, wherein the thread-specific data is determined to be reachable only by the first thread. The shared data is allocated to the shared heap, wherein the shared data is deemed potentially reachable by a plurality of the program threads of the target program.

These and various other features as well as other advantages, which characterize the present invention, will be apparent from a reading of the following detailed description and a review of the associated drawings.

DETAILED DESCRIPTION OF THE INVENTION

Figure 1:
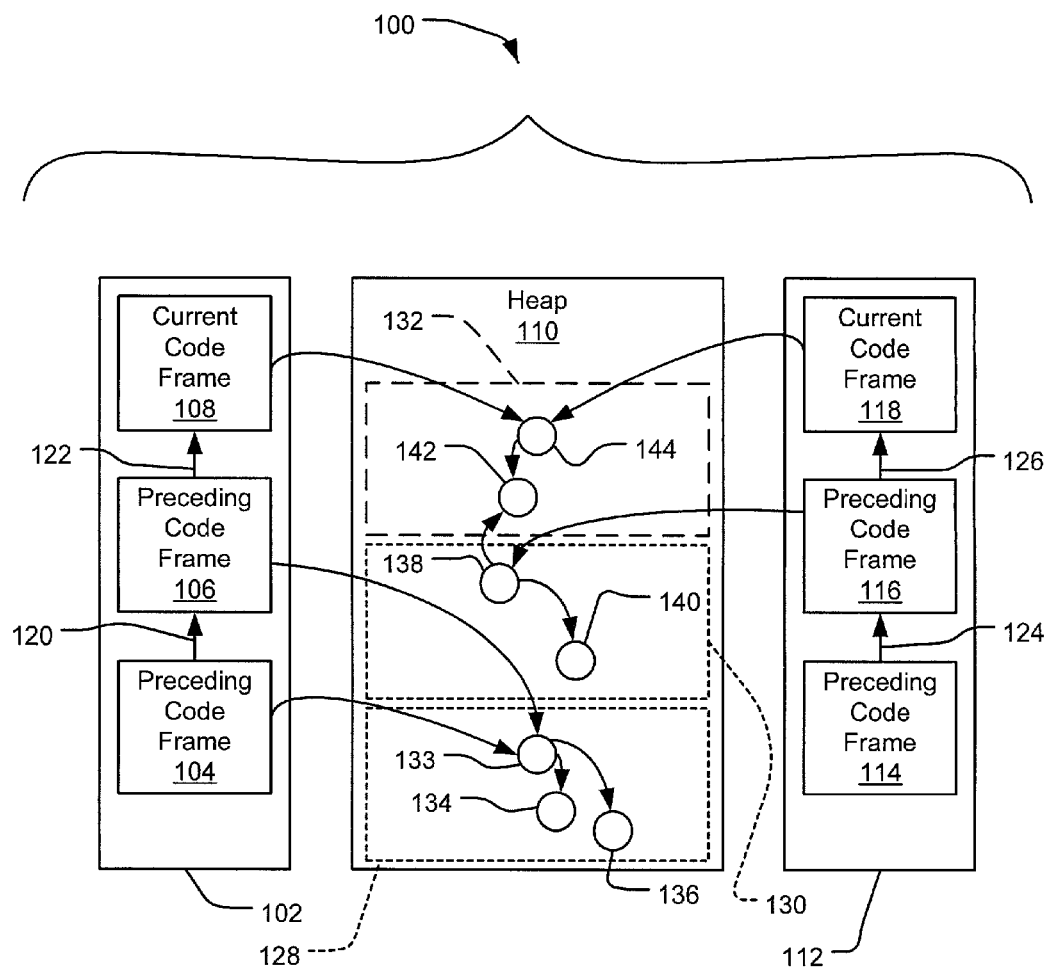
FIG. 1 depicts a heap of a multithreaded target program in an embodiment of the present invention.

An embodiment of the present invention includes a compiler that analyzes target program code and configures the target program to allocate program data to a thread-specific heap or a shared heap. The compiler can distinguish between thread-specific data and shared data in the target program. One manner in which the compiler may configure the target program is to replace original allocation instructions in the target program source code with new allocation instructions directed at an appropriate heap. Alternatively, the compiler may indicate a signal or parameter to a run-time environment (e.g., via metadata associated with the target program code) so that a run-time memory manager can allocate individual program data to appropriate heaps.

Thread-specific data is distinguished from shared data in that thread-specific data is determined to be unreachable from outside of a given program thread. An exemplary method of determining whether program data is deemed potentially reachable from outside of a given program thread is called "thread escape analysis", although other analysis methods are also contemplated within the scope of the present invention. Program data that is not determined to be "thread-specific data" is deemed "shared data". As such, shared data includes program data that is deemed potentially reachable from multiple program threads. Furthermore, a thread-specific heap may exist for each program thread of a target program, and program data specific to each program thread are allocated appropriately to the associated thread-specific heap.

During runtime, thread-specific data is allocated to thread-specific heaps, and shared data is allocated to one or more shared heaps. At some appropriate time during execution, a garbage collector module reclaims memory for unneeded program data from one or more of the target program's heaps. Because no thread-specific data within a thread-specific heap is determined to be reachable from outside the associated program thread, the thread-specific heap can be collected without impacting (e.g., suspending or synchronizing with) the execution of other program threads in the target program. In addition, the impact of garbage collection of the shared heap on program threads can be minimized because the program threads can substantially continue their execution so long as they do not access program data in the shared heap.

It should be understood that exemplary program analysis that determines "reachability" at compile time is based on a conservative estimate of what may occur at runtime. Therefore, in an embodiment of the present invention, the program analysis at compile time proves that an object is "thread-specific" by proving that the object will never be referenced by multiple threads. However, an object may be deemed potentially reachable by multiple threads (i.e., "shared"), if it cannot be proven that the object will never be referenced by multiple threads (i.e., even though it has not been proven that the object will indeed be referenced by multiple threads during execution). In contrast, during runtime, reachability can be specifically determined, thereby making the conservative approximation unnecessary during runtime.

FIG. 1 depicts a heap of a multithreaded target program in an embodiment of the present invention. The multithreaded target program 100 is shown as executing in a runtime environment of a computer system. Exemplary runtime environments may reside in a standalone computer executing a single user or multi-user operating system, in a networked computer executing intermediate language code using an execution engine, or in other types of computer systems.

The target program 100 includes multiple concurrently executing program threads, such as a program thread 102 and a program thread 112. The program thread 102 is represented by a run-time call stack of code frames 104, 106, and 108. Each code frame includes data for a method that is called during program thread execution, as represented by calls 120 and 122. Likewise, a second program thread 112 is illustrated with a runtime stack of code frames 114, 116, and 118 (i.e., a code stack). Each code frame includes data for a method called during program thread execution, as represented by calls 124 and 126. Objects (e.g., variables, data fields and class instances) having lifetimes that do not exceed the lifetime of the associated code frame may be allocated within the stack. For example, a method may include a local data structure that is statically defined in the source code as an array of four integers (e.g., the array may be defined in the C or C++ programming languages using an exemplary instruction "int fooArray[4];". At compile time, the compiler can then configure the target program to include the array within the stack.

In contrast, a developer may not wish for memory to be allocated on the stack, such as when the lifetime of the object exceeds the lifetime of the associated code frame. Therefore, the developer may include program instructions for dynamically allocating data in memory that is separate from the stack. Such dynamic allocation is accomplished in a heap, such as a heap 110. In a C programming language, dynamic allocation in a heap may be indicated using the keyword "malloc", for example. In C++, dynamic allocation in a heap may be indicated using the keyword "new", such as in "fooClass fooObject=new fooClass;" where fooClass is the object's class and fooObject is the name of the class instance. In the C++ example, the fooObject instance of class fooClass is allocated in the heap.

Many programming languages do not offer a developer an explicit mechanism for indicating when an object is no longer used and when the memory for the object may be recycled for other purposes. Such languages typically rely on alternative mechanisms in a runtime system to reclaim memory of unused objects. Objects that are no longer used are often called "garbage objects", and the mechanism for reclaiming the memory used to represent garbage objects is often called a "garbage collector". An exemplary garbage collector classifies an object as a "garbage object" if the object is not reachable from the program state at the point where the garbage collector is activated. Another exemplary garbage collector classifies an object as a "garbage object" if it can be proven that the object is not to be accessed subsequent to the activation of the garbage collector. For the latter garbage collector, for example, garbage objects may be reachable from pointers in unused parts of the program state. In the description herein, it is assumed that garbage objects are no longer reachable from the program state. However, this assumption is not intended to so limit operation within the scope of the present invention.

In garbage collection terminology, a "root" is an object that is a priori "reachable". Typical roots include global objects, other state data, and objects allocated in the stack. The root set is used as the starting point in determining all reachable data. An object is considered "reachable" if the object is referenced by a root or another reachable object. For example, a pointer allocated in the stack is a root, and heap-allocated data that the pointer references are considered reachable. In addition, if the reachable heap-allocated object includes a pointer to any other heap-allocated objects, the other heap-allocated objects are also considered reachable. This designation continues recursively down the pointer chain.

In FIG. 1, the heap 110 includes three individual component heaps 128, 130, and 132. The heap 132 (shown by a dashed line rectangular box) is a "shared heap". As shown, both program threads 102 and 112 reference the object 144 within the shared heap 132. For example, both the current code frame 108 in program thread 102 and the current code frame 118 in program thread 112 contain pointers to the object 144 in the shared heap 132. The object 144 also references another object 142, also allocated in the shared heap 132. As such, both objects 144 and 142 are determined to be reachable from both program threads 102 and 112.

In contrast, heaps 128 and 130 (represented by dotted line rectangular boxes) are "thread-specific heaps". In thread-specific heap 130, thread-specific objects 138 and 140 are reachable only from program thread 112. In addition, the object 138 also references the thread-specific object 142, which is allocated in the shared heap 132. Likewise, in thread-specific heap 128, thread-specific objects 133, 134, and 136 are reachable only from the program thread 102.

In an embodiment of the present invention, the specific allocation of an object in the shared heap 132 or one of the thread-specific heaps 128 and 130 is governed by code analysis of the target program 100, such as during compilation. Such code analysis can identify objects that are allocated by a given thread and are determined to be unreachable from outside that program thread. An object that is proven to be reachable by only a single program thread is referred to as a "thread-specific object". In contrast, if the object is deemed potentially reachable by more than one program thread, the object is referred to as a "shared object".

In describing the embodiment of FIG. 1 below, it is assumed that the operation of a default allocation instruction results in allocation to a shared heap. However, this assumption is not intended to so limit operation within the scope of the present invention. In an alternative embodiment, a default allocation instruction may result in allocation to a thread-specific heap. In yet another alternative embodiment, a default allocation instruction may generically identify an allocation operation (e.g., without specifying the target heap).

In one embodiment of the present invention, the compiler analyzes the target program and determines, for each data allocation, whether the data should be allocated in the shared heap or in a thread-specific heap. An exemplary program analysis used to determine which data is shared and which data is thread-specific is called "thread escape analysis", which may be based on type unification mechanisms and polymorphic summaries of methods. One such analysis relies on a previously established conservative estimate of the program call graph. For example, summary information about methods is propagated from callees to callers to track references to heap-allocated data. The results of the program analysis are used to classify data allocation and access instructions as either creating or accessing thread-specific data or shared data and to apply appropriate constraints to the data and associated statements. It should be understood that non-compiler modules may also be used to analyze the target program and apply the appropriate constraints therein.

Thread escape analysis, in an embodiment of the present invention, computes for each global value (e.g., reference constant or static field) and its (transitive) fields and array elements a conservative estimate of whether the value is accessed by more than one program thread. The analysis also computes for each method a conservative estimate of the aliases and program thread access effects of the method and its (transitive closures of) callees. The exemplary analysis relies on a conservative estimate of the program call graph, although other analyses may be performed by discovery of the call graph, such as by using a Milner-Mycroft style type inference mechanism. See A. Mycroft, "Polymorphic Type Schemes and Recursive Definitions", Proceedings of the International Symposium on Programming, number 167 in Lecture notes in Computer Science, p. 217–228, Springer-Verlag, 1984.

By virtue of the thread escape analysis, data presumed accessed by multiple program threads, and all data deemed potentially reachable by such data, are considered to have escaped the program thread and are, therefore, designated as shared data. As such, for example, a global variable may be considered thread-specific, if the global variable is only accessed by a single program thread. Furthermore, any data that is determined to be accessed by multiple program threads (under conservative assumptions about program behavior) are marked as "shared", and any data that could be stored in a field or array element of a "shared" data is also deemed "shared".

In an exemplary thread escape analysis, runtime data is represented by an "alias set" data structure, where aliasSet::=⊥|{fieldMap, created, refThreads, global)

The created Boolean element is true in aliasSet components of a method context if the value is data that may have been created in a method or its (transitive) callees. A method context is a data structure that is used to represent the side effect and behavior of a given method. The refThreads element defines a set of program threads accessing the data (e.g., zero, one, or multiple program threads). When the global Boolean element is true, the refThreads element describes the set of program threads that may access the value or may access data from which the value is reachable. Data is deemed "shared" if global is true and refThreads denotes multiple program threads.

For an exemplary allocation statement of the form:

v=new T;

the following constraint may be added:

AS(v).created=TRUE;

where AS(v) returns the aliasSet representing the value stored in the variable v. For each statement in a method m accessing the value v, the following constraint may be added:

if AS(v).global=TRUE recursiveAddRefThread(AS(v), TC(m));

where recursiveAddRefThread(a,b) augments the refThreads element of a, as well as the refThreads elements of all aliasSets reachable from a with the set of program threads b. The TC(m) function returns a conservative estimate of the set of threads that may call the method m. Method contexts may be computed by an analysis summarizing the alias and program thread effects of a given method, such as using the procedure described in E. Ruf, "Effective Synchronization Removal for Java", Proceedings of the ACM SIGPLAN '00 Conference on Programming Language Design and Implementation, ACM Press, Vancouver, Canada, June 2000, incorporated herein by reference for all that it teaches and discloses. However, in contrast to the procedure described in Ruf, the pruning of method contexts in one embodiment of the present invention reflects those created objects that reference the variable v, rather than synchronized objects.

In one embodiment, a compiler or code specializer may replace or modify statements to configure the target program to allocate program data to a thread-specific heap or a shared heap, a process referred to as "code specialization". For example, if the statement "v=new T" allocates by default to the shared heap, a code specializer may replace the original statement with a new statement "v=threadNew T", if the created object or objects have been proven to be "thread-specific". In addition, the code specialization may also include inserting instructions that will determine at runtime which thread is allocating the data and, therefore, to which thread-specific heap the data should be allocated. Accordingly, during runtime, the data will be allocated to an appropriate thread-specific heap in accordance with its relevant thread.

The indication of "thread-specific" may be discerned from the aliasSet that describes the created data (i.e., AS(v), if the reference to the data is stored in v). If global is false, then the data is not reachable from a global value and the data may be allocated in a thread-specific heap. If global is true, then the data may potentially be reached from one or more global values, and the refThreads element describes the set of program threads accessing these global values. If refThreads does not identify any program thread (i.e., is the empty set), then the object is never created. If refThreads identifies only one program thread, the data may be allocated to a thread-specific heap associated with that program thread. If refThreads identifies more than one program thread, then the data is deemed potentially reachable by multiple threads and is allocated in the shared heap. It should be understood that code specialization can also be accomplished through a runtime determination of an appropriate heap destination, such that the runtime environment or associated utility modules interpret the statement appropriately and direct the allocation to the appropriate heap.

In alternative embodiments, code specialization may be accomplished directly or indirectly. For example, a code specializer may directly configure the target program by replacing the "new" operation with the "threadNew" operation. Alternatively, the code specializer can replace the "new" operation with an indirect allocation operation that runtime-allocates to either the thread-specific heap or the shared heap in accordance with some indicator associated with the object or the code (e.g., an allocation parameter in the metadata associated with the object or the code).

In an alternative embodiment of the present invention, multiple shared heaps may also be employed. For example, if a given object is accessed by a subset of the program threads, the object may be allocated into a shared heap that is only shared by those program threads (i.e., "a subset-shared heap"). Such a configuration may consume additional resources as compared to a single shared heap configuration, but the other threads that do not share the subset-shared heap need not wait for a collection of the memory from the subset-shared heap.

Figure 2:
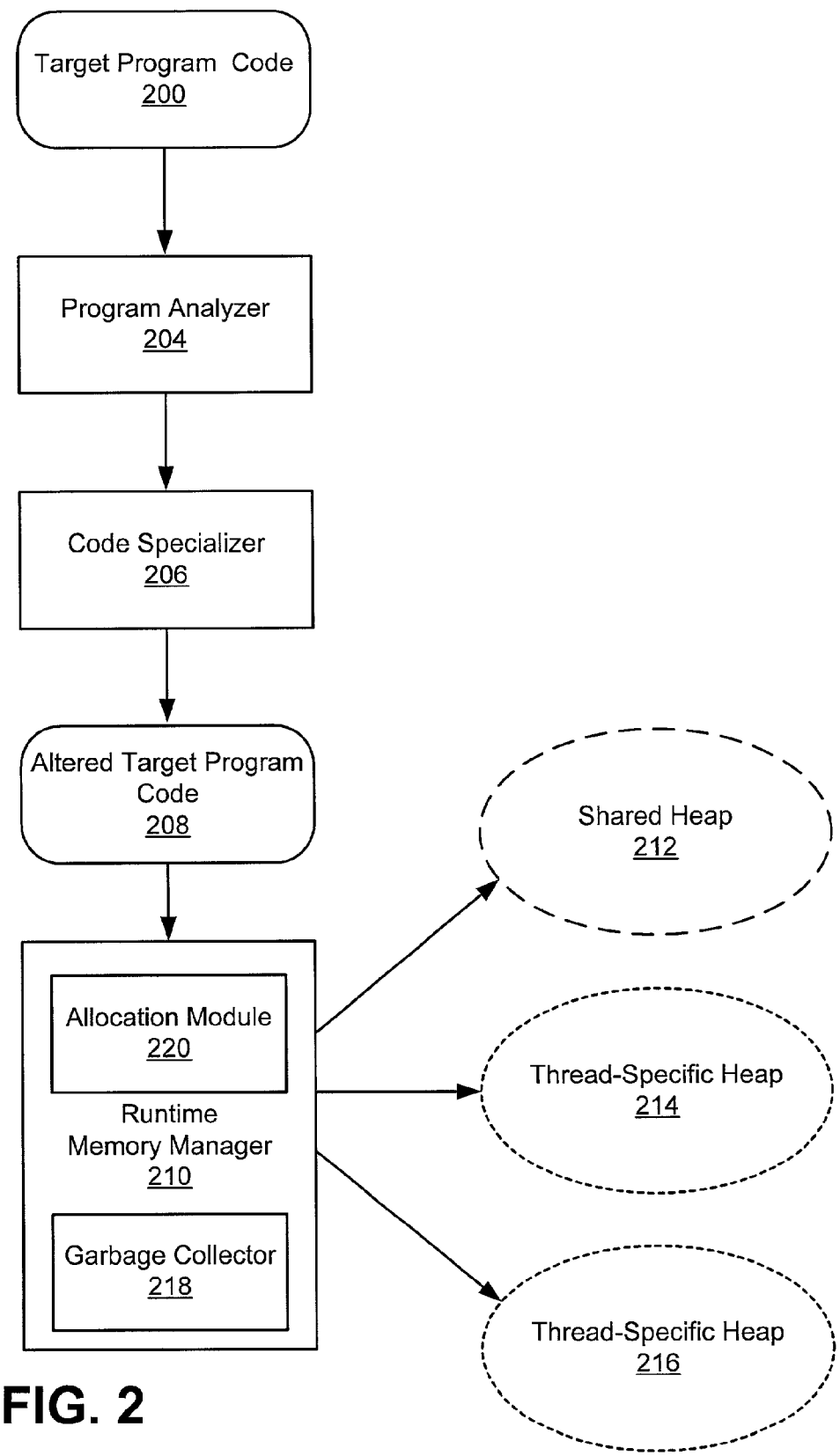
FIG. 2 depicts exemplary components of a heap management system in an embodiment of the present invention.

FIG. 2 depicts exemplary components of a heap management system in an embodiment of the present invention. Target program code 200 represents a multithreaded program. The target program code 200 may include low-level code, such as machine or byte code, and/or other code representations, such as source code, intermediate language code, or a compiler's internal program representation. The target program code 200 is input to a program analyzer 204, which may be a component of a compiler (not shown) or an independent software module. The program analyzer 204 analyzes the target program code 200 to identify thread-specific data and shared data. It is possible that a given target program may use only thread-specific data or only shared data; however, for the purposes of this description, it will be assumed that the target program code 200 uses at least one thread-specific object and at least one shared object. In the illustrated embodiment, the program analyzer 204 employs a thread escape analysis to perform the proper identification of the data, although other analysis methods are contemplated within the scope of the present invention.

A code specializer 206 configures the target program code (e.g., the code instructions, metadata, or associated configuration data) to allocate program data to an appropriate thread-specific heap (e.g., 214 or 216) or shared heap (e.g., 212), producing the altered target program code 208. In one embodiment, the code specializer 206 is a component module of a compiler. However, the code specializer 206 may be a separate module or may be integrated into the runtime environment. During execution of the altered target program 208, an allocation module 220 in a runtime memory manager 210 dynamically allocates objects in the appropriate heap (e.g., e.g., 212, 214, or 216), in accordance with the code specialization alteration or other indications. In addition, a garbage collector 218 may be included within the memory manager 210, although a separate garbage collection module may be used (e.g., individual applications may provide their own garbage collector modules). Also, the shared heap and the individual thread-specific heaps may each use different garbage collection modules.

Figure 3A:
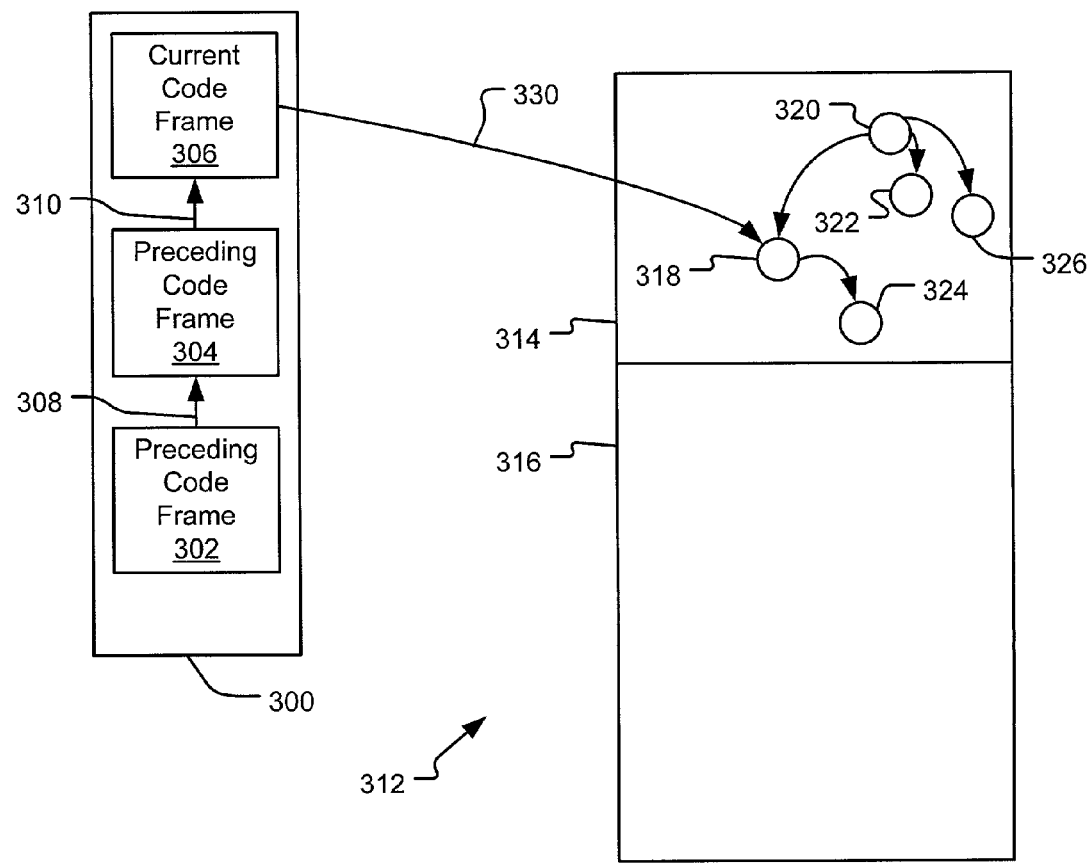
FIG. 3A illustrates a generational heap in an embodiment of the present invention.

FIG. 3A logically illustrates a generational heap in an embodiment of the present invention. A heap 312 in FIG. 3A includes two regions: (1) a young generation region 314 and (2) an old generation region 316. The heap 312 is described in association with a generational garbage collection scheme (a form of copying garbage collection) although other heap configurations and garbage collection schemes are also contemplated within the scope of the present invention, including without limitation semi-space garbage collection, non-copying garbage collection, conservative garbage collection, incremental garbage collection, and reference counting.

Generational garbage collection applies the assumption that "young objects are more likely to die than old objects". The intuition is that if a generational garbage collection scheme focuses its effort on scanning recently created data (e.g., young generation data), then the garbage collectors scanning efforts provide more benefit in the form of more recovered garbage (i.e., more reclaimed memory) in a shorter period of time, than if the garbage collector scans older data (e.g., old generation data). Even within the concept of generational garbage collection, there may be variations of the illustrated embodiment (e.g., there may be more than two generations) that are also contemplated within the scope of the present invention. The process of generational garbage collection from shared heaps is known in the art. However, incorporation of generational garbage collection in association with thread-specific heaps is an improvement over the prior art, and therefore, will be described in more detail below.

In FIG. 3A, a code stack 300 of a given program thread includes the current code frame 306 and preceding code frames 304 and 302. Each code frame in the stack includes a method call from a preceding code frame, as show by call arrows 308 and 310. Program data may be allocated in the code frame of the code stack. Such stack-allocated data can reference data in a heap (e.g., a thread-specific or a shared heap).

An embodiment of the present invention includes heaps for thread-specific data of each program thread and one or more heaps for shared data. Each heap has a young generation region and an old generation region. One section of memory is used to contain all the young generation regions, and another section of memory is used to contain all the old generation regions. Chunks of these sections of memory are assigned to each heap as needed. To make tracking the thread-specific data versus the shared data easier, the thread-specific heap are allocated chunks of memory starting from the lower end of the memory sections and the shared heap are allocated chunks of memory staring from the upper end of the memory sections. However, this memory configuration is merely exemplary and alternative memory configurations are also contemplated within the scope of the present invention.

The heap 312 is shown in FIG. 3A as containing five objects in a young generation region 314, including an object 320 that references objects 318, 322, and 326, and an object 318 that references object 324. Reference arrow 330 indicates a reference from the current code frame 306 in the stack 300 to the object 318 in the young generation region 314 of the heap 312. Newly allocated objects are initially allocated in the young generation region 314 of the heap 312. Garbage collection of either the young generation region 314 or the old generation region 316 may be triggered by many conditions, including a detected need for additional available heap space, a time-dependent trigger, and other triggering means.

To perform garbage collection on the young generation region 314, the garbage collector traverses the root set to identify all reachable objects (i.e., directly or indirectly reachable objects). In one embodiment, a Cheney scan technique is employed to examine the objects in memory and to identify those references within objects. Cheney scan techniques are described in detail in C. J. Cheney, "A Non-Recursive List Compacting Algorithm", Communications of the Assocation for Computing Machines (CACM), 13–11 pp. 677–678 (1970). The references identified by the Cheney scan are thus used to trace the object references (e.g., to construct a graph of the object references) and determine which objects are reachable. For example, in FIG. 3A, objects 318 and 324 are reachable from a root (i.e., an object in the stack). In alternative embodiments, other scanning and tracing techniques may be employed to identify reachable objects.

Figure 3B:
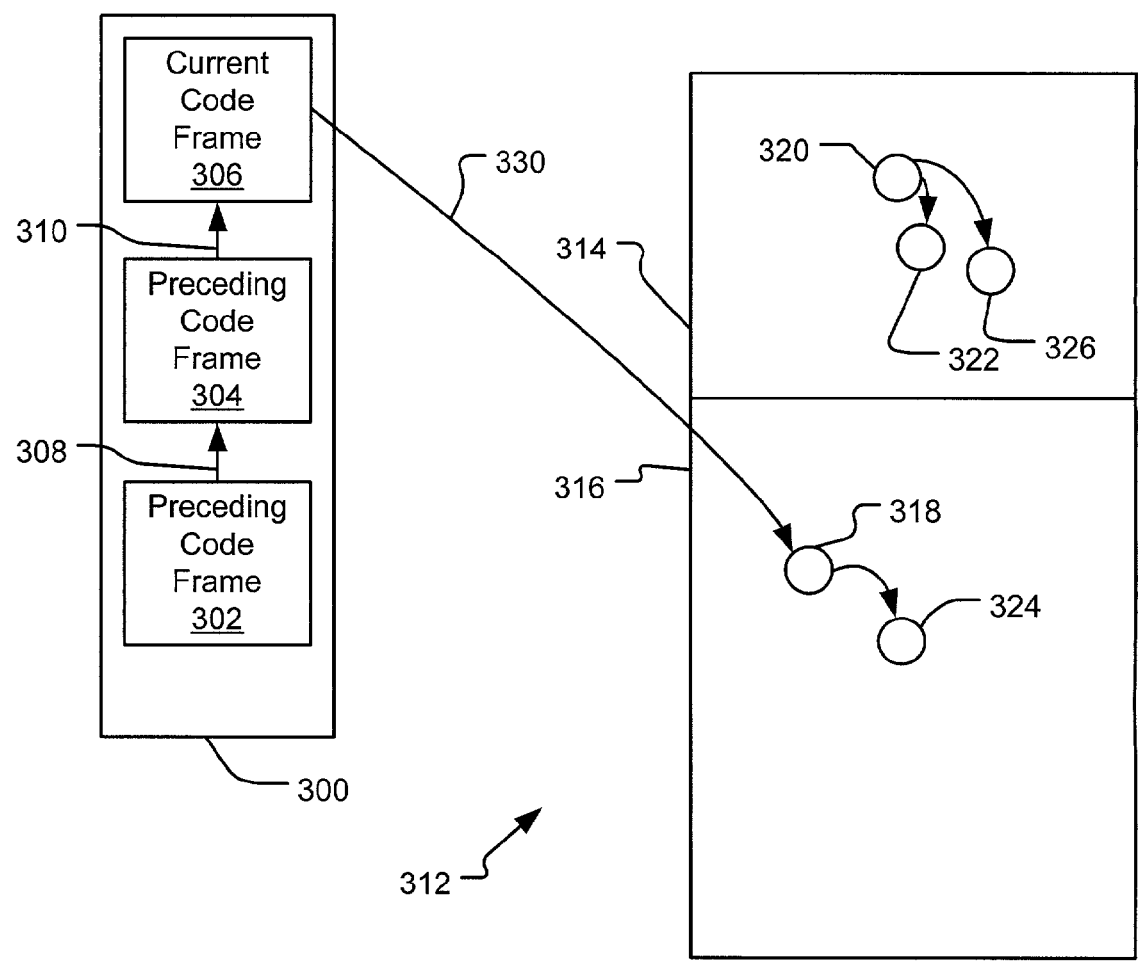
FIG. 3B illustrates a generational heap during a garbage collection of a young generation region in an embodiment of the present invention
Figure 3C:
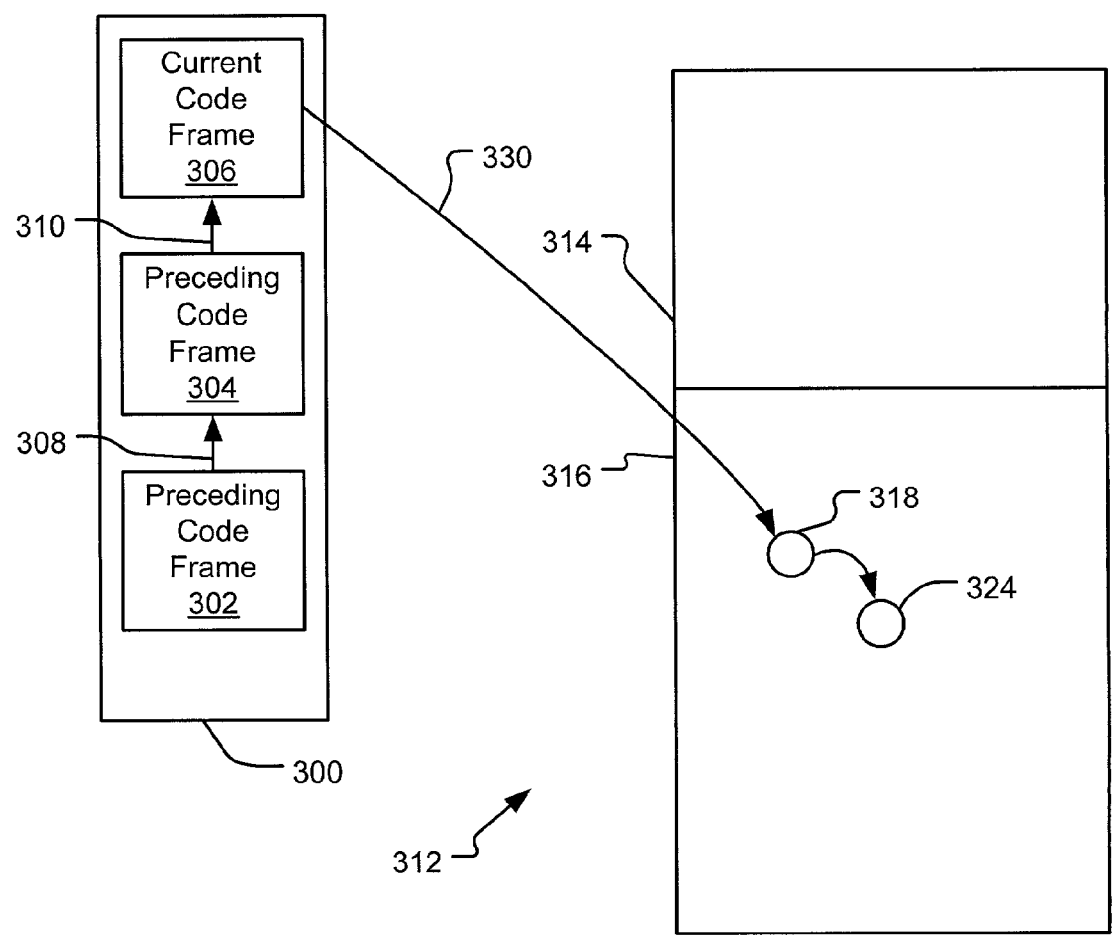
FIG. 3C illustrates a generational heap after a garbage collection of the young generation region in an embodiment of the present invention.

FIG. 3B illustrates a generational heap during a garbage collection of the young generation region in an embodiment of the present invention. The young generation objects (i.e., objects in the young generation region 314) of FIG. 3A that are reachable are moved from the young generation region 314 to the old generation region 316, as shown by the location of reachable objects 318 and 324 in FIG. 3B. "Moving" conceptually refers to copying a source object from the young generation region 314 to the old generation region 316, fixing up pointers to reference the newly copied object in the old generation region 316, and deleting the source object from the young generation region 314. When using a Cheney scan, the pointers in the non-reachable objects 320, 322, and 326 will not be updated to point to the copied objects 318 and 324. Having determined that objects 320, 322, and 326 are not reachable, the garbage collector can then reclaim the corresponding memory, as shown in FIG. 3C. Heap memory in the new generation region 314 is thus reclaimed to make room for new objects allocated in the young generation region 314. The old generation region 316 may also be garbage collected in a similar manner at an appropriate time (e.g., when available old generation memory becomes too limited).

Figure 4A:
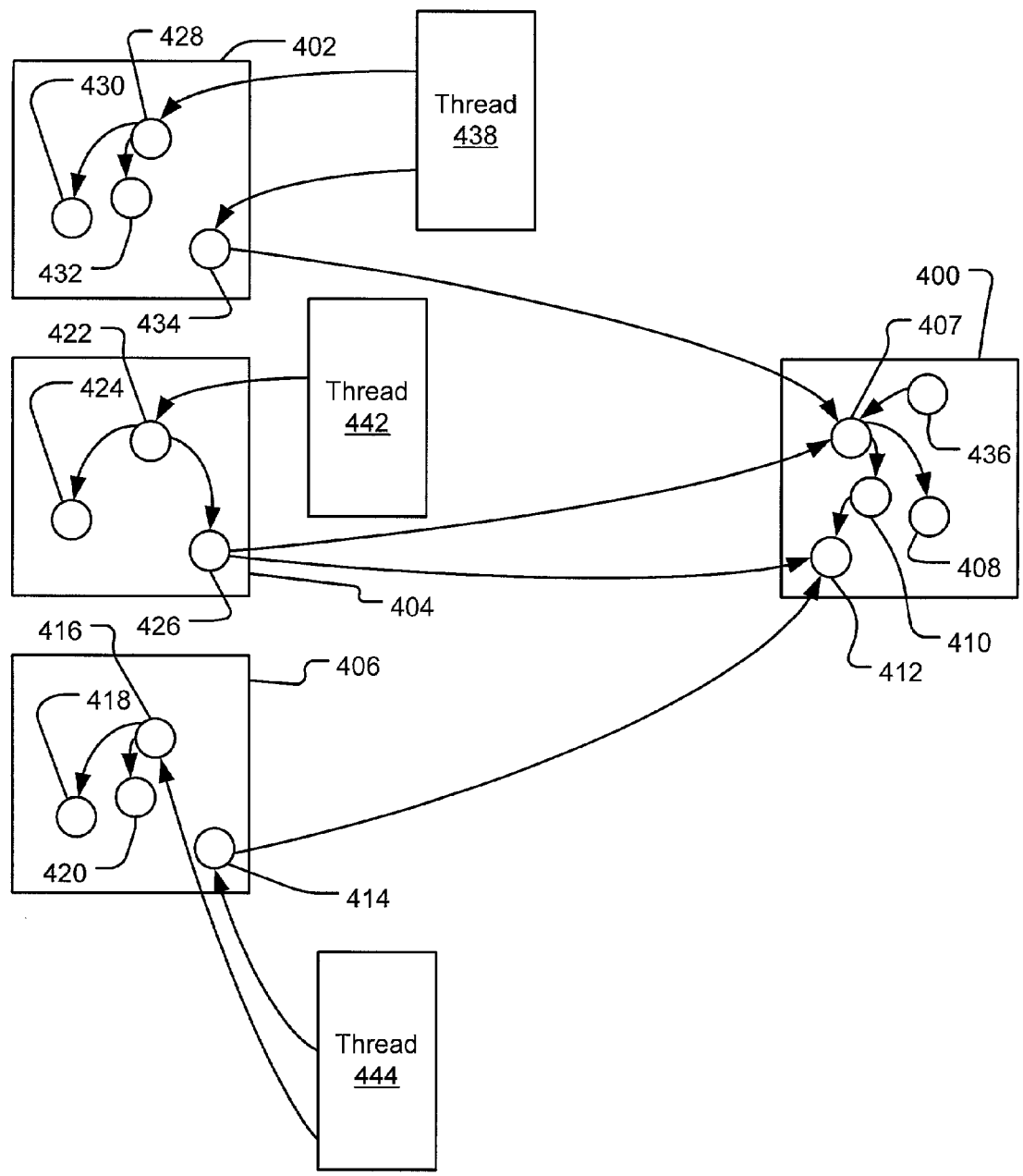
FIG. 4A illustrates a shared heap and three thread-specific heaps in an embodiment of the present invention.

FIG. 4A illustrates a shared heap, three program threads, and three thread-specific heaps in an embodiment of the present invention. A thread-specific heap 406 contains thread-specific objects 416, 418, 420, and 414 that are reachable only by program thread stack 444. Another thread-specific heap 404 contains thread-specific objects 422, 424, and 426 that are reachable only by program thread stack 442. A third thread-specific heap 402 contains thread-specific objects 428, 430, 432, and 434 that are reachable only by program thread stack 438. A shared heap 400 contains shared objects 407, 408, 410, and 412 that are directly or indirectly reachable by multiple program threads. Note that the shared heap 400 also contains an object 436 that is no longer reachable and is therefore subject to collection.

It should be understood that at any given time, an individual "shared" object may be allocated into the shared heap 400 but be referenced by only one program thread at that time. For example, program thread 406 may allocate object 412 and, for a time period of program execution, program thread 406 may be the only program thread referencing object 412. However, the program analyzer determined that other program threads could potentially reach the object 412 during program execution and, therefore, the object 412 was allocated to the shared heap. As illustrated, the object 412 is shown as being reachable by all three program threads of FIG. 4A during another time period of program execution.

When the shared heap 400 is collected, all program threads rendezvous, so as to prevent corrupting the shared heap 400. In one embodiment, a Cheney scan is performed on the data in the heaps (i.e., the thread-specific heaps 402, 404, and 406 and the shared heap 400) to identify reachable and non-reachable data and to copy the appropriate data to its new destination. The thread-specific heaps 402, 404, and 406 may also be collected during this rendezvous.

Another interesting characteristic of the memory allocation and collection technique disclosed herein is that garbage collection of a thread-specific heap can occur independently from the execution of other program threads in the target program. In traditional approaches, as discussed, multiple program threads reference data in a shared heap, requiring that program threads rendezvous before collection is performed. However, in an embodiment of the present invention, allocation of thread-specific data to thread-specific heaps allows collection of each thread-specific heap without synchronizing the associated program thread with other program threads. Nevertheless, the associated program thread is synchronized with the garbage collecting thread. Alternatively, the thread may perform its own garbage collection. In addition, collection of a thread-specific heap can also be performed without also collecting the shared-heap (i.e., independently of garbage collection of the shared heap).

In the embodiment illustrated and described with reference to FIG. 4A, data in thread-specific heaps is also collected when a shared heap is collected, which contributes to garbage collection latency. However, an individual program thread need not wait for the collection of the other thread-specific heaps to be completed before the individual program thread can continue execution. As such, the garbage collection of the individual thread-specific heap can occur independently of garbage collection of other thread-specific heaps or execution of the associated program threads.

Figure 4B:
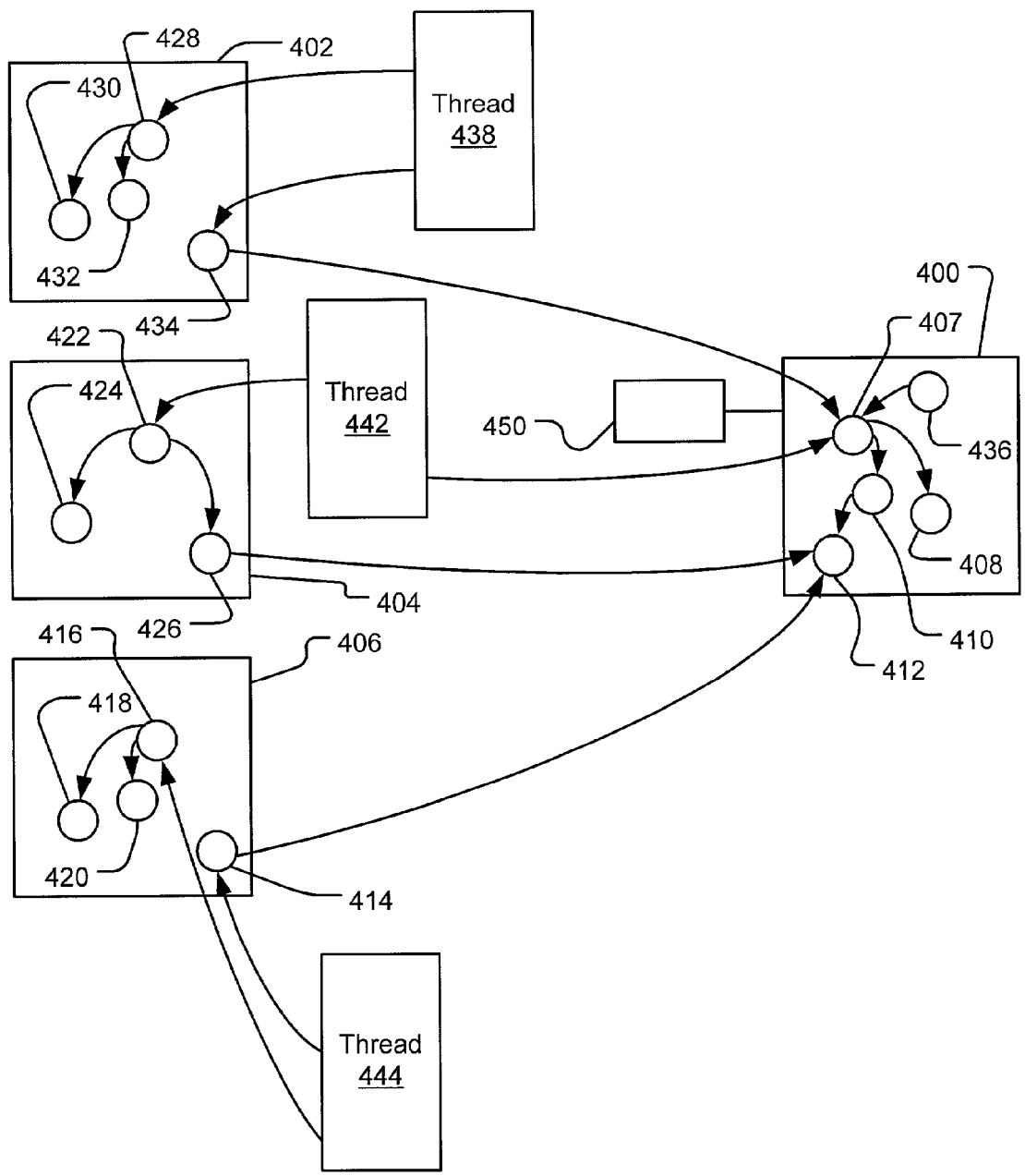
FIG. 4B illustrates a shared heap, a remembered set, and three thread-specific heaps in an embodiment of the present invention.

FIG. 4B illustrates a shared heap, a remembered set, three program threads, and three thread-specific heaps in an embodiment of the present invention. A remembered set is a structure used to keep track of interesting references between two or more sets of objects (e.g., between two different heaps). With a remembered set 450 that tracks references between the shared heap 400 and the thread-specific heaps 402, 404, and 406, a garbage collector does not have to scan the thread-specific heaps 402, 404, and 406 to determine whether objects in the shared-heap 400 remain reachable from the thread-specific heaps 402, 404, and 406. Note that shared object 407 in FIG. 4B is referenced from thread 442 and from thread-specific object 434, which is associated with thread 438.

The tracking of references in a remembered set may be accomplished using a "write barrier" that causes write access operation that writes a pointer to an object to result in the updating of the remembered set with an identifier of that object. A write barrier is a block on writing to certain memory regions by certain program threads or processes. Barriers can be implemented in either software or hardware. Software barriers involve additional instructions around write operations, which would typically be added by a cooperative compiler. Hardware barriers do not generally require compiler support and may be implemented on common operating systems by using memory protection. In this manner, the remembered set 450 can maintain identifiers of objects that access shared objects in the shared heap 400.

Use of a remembered set allows a shared heap to be collected without also scanning or collecting the associated thread-specific heaps. By avoiding the need to scan the data in the thread-specific heaps, individual program thread execution can continue using thread-specific data during shared heap collection, although any program thread accesses to the shared heap must be synchronize with the garbage collector thread to avoid corrupting the collection process. Furthermore, because the scan of the thread-specific heaps is omitted, garbage-collection of these thread-specific heaps may be postponed without any performance penalty (e.g., without wasting a scan of a thread-specific heap).

If reference from thread-specific objects in the thread-specific heaps to shared objects in the shared heap are discovered during the Cheney scans of the thread-specific heaps and the referenced objects in the shared heap or reachable shared objects therefrom have not yet been copied or scanned, synchronization among threads is necessary to ensure that a thread is only reactivated after all shared objects reachable from the thread's roots have been copied. For many programs, if share objects referenced by the roots are copied and a Cheney scan is performed for the shared heap prior to the collection of the thread-specific heaps, the majority of reachable shared objects will have been copied. Therefore, if the thread-specific heaps are subsequently collected, the number of reached, un-copied, shared objects will be small and a minimal amount of synchronization among threads will be necessary.

Figure 4C:
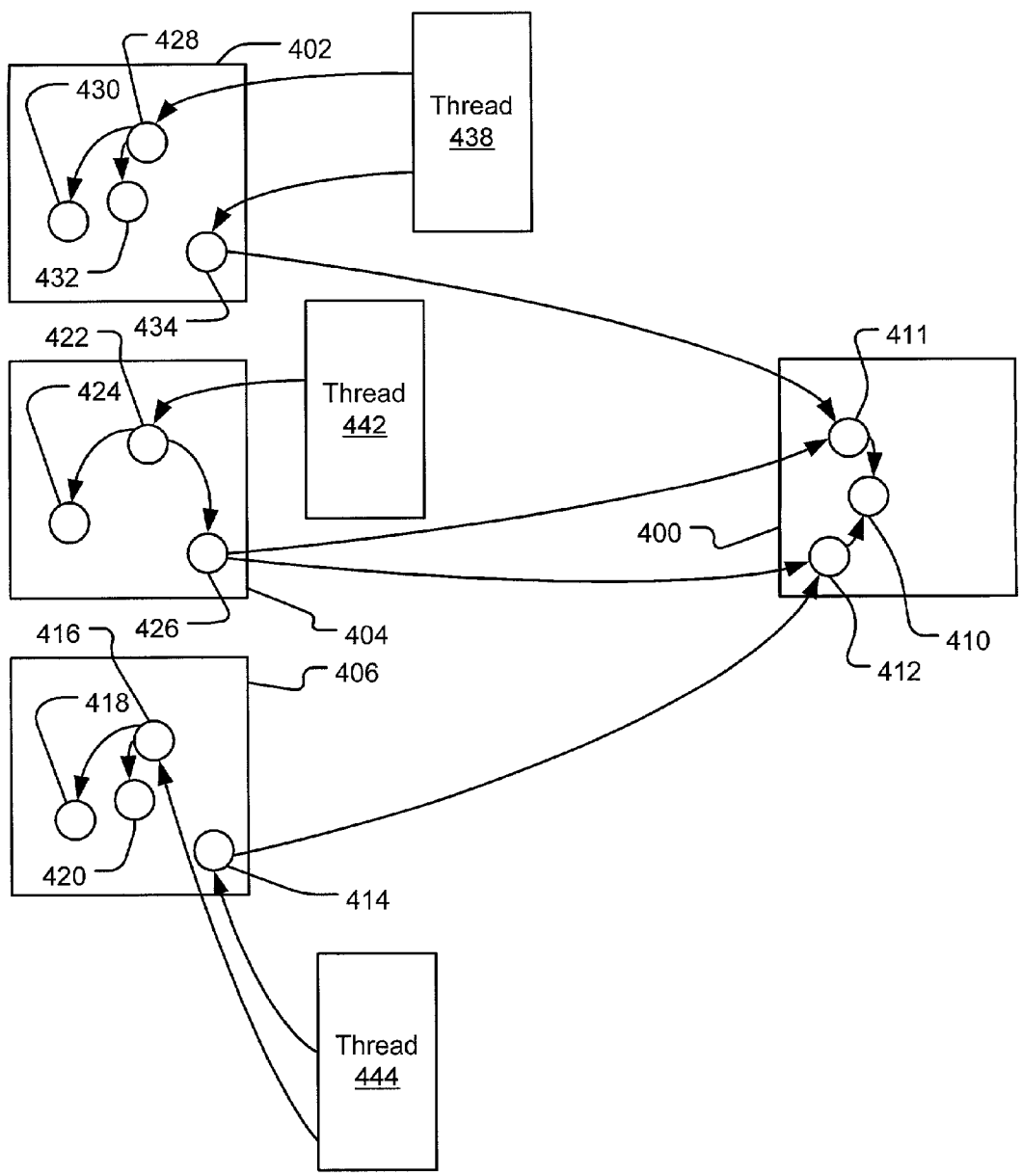
FIG. 4C illustrates a shared heap, three program threads, and three thread-specific heaps in an embodiment of the present invention.

FIG. 4C illustrates a shared heap, three program threads, and three thread-specific heaps in an embodiment of the present invention. A shared heap 400 contains shared object 411 that is reachable from thread-specific objects 434 and 426, and shared object 412 that is reachable from thread-specific objects 414 and 426. The shared heap 400 also contains a shared object 410 reachable from shared objects 411 and 412.

In one embodiment of the present invention where the shared objects referenced by the roots are copied and a Cheney scan over the copied shared objects is performed before any thread-specific objects are scanned, the objects 411, 410, and 412 will not be copied by the Cheney scan. Threads 438, 442, and 444 may not access shared objects 411, 410 and 412 before these objects have also been copied and updated in the shared heap 400.

An exemplary embodiment of the present invention copies and updates the objects 411, 410, and 412 before reactivating the program threads 438, 443, and 444. If the thread-specific heaps 402, 404, and 406 are collected concurrently subsequent to the Cheney scan of the copied shared objects, the threads 438, 442, and 444 may use synchronization to ensure that exactly one thread copies shared objects 411 and 412. The threads 438, 442, and 444 may further use synchronization to ensure that all shared objects (in particular shared object 410) reachable from a program thread have been properly copied and updated before the program thread is reactivated.

Figure 5:
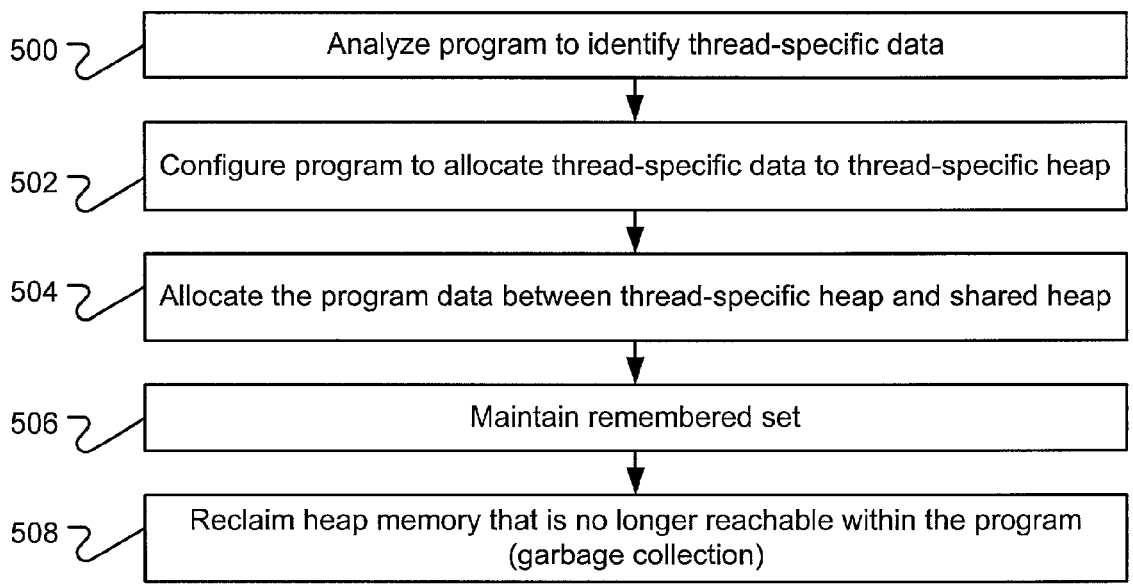
FIG. 5 depicts a flow diagram of operations for managing thread-specific heaps in an embodiment of the present invention.

FIG. 5 depicts a flow diagram of operations for managing thread-specific heaps in an embodiment of the present invention. Analysis operation 500 analyzes data (e.g., objects) of a program to distinguish between thread-specific data and shared data. In one embodiment, the target program source code is analyzed using a thread escape analysis to identify the data that is deemed potentially by multiple program threads, although other analyses are contemplated within the scope of the present invention. In an alternative embodiment, intermediate language code may be analyzed to identify thread-specific data. In yet another alternative embodiment, binary code may also be analyzed to identify thread-specific data, possibly in combination with the debug information. Data that is deemed potentially reachable by multiple program threads is identified as shared data.

Configuration operation 502 configures the program to allocate thread-specific data to thread-specific heaps and to allocate shared data to a shared heap. As discussed above, the configuration operation 502 may alter the source code of the target program, such as by substituting an original heap allocation method call with a thread-specific heap allocation method call. Alternatively, the intermediate language code or binary code may also be altered. In yet another alternative embodiment, a run-time memory manager can dynamically determine the appropriate heap to which an object is allocated, such as in response to parameters or metadata generated by the program analyzer in the analysis operation 500. It should also be understood that configuring also includes leaving an original allocation instruction in the target program to perform its default operation (e.g., a configuration operation may leave the statement "v=new T" in the target program because the variable v is determined to reference potentially shared data and the default operation of the instruction new is to allocate to a shared heap).

Allocation operation 504 performs the actual allocation of data between thread-specific heaps and a share heap at run-time. In one embodiment, the application operation 504 is performed in association with the runtime memory manager of the computer system. In an embodiment employing generational garbage collection, new objects are typically allocated in a young generation region of the appropriate heap, although other configurations are contemplated within the scope of the present invention, as discussed above. In another embodiment, large objects (e.g., greater than 256 kilobytes in size), however, may be allocated directly to the old generation region of a heap, depending on the memory allocation scheme employed.

In one embodiment of the present invention, remembering operation 506 maintains a remembered set associated with the shared heap. A remembered set keeps track of references that a garbage collector does not want to identify through scanning. If the remembered set records reference from the thread-specific heaps and the program thread stacks, then the garbage collector does not need to scan the thread-specific heaps or the program thread stacks when trying to collect the shared heap. If the remembered set contains references from the thread-specific heaps but not from the runtime stacks, then the runtime stacks are scanned by the collector to identify references into the shared heap.

An exemplary method for maintaining a remembered sets includes, for each write operation that results in a shared data being referenced from the thread-specific heap or a program thread stack, an identifier of the shared object stored in a remembered set. In an alternative embodiment, remembering operation 506 in the omitted and replaced by scans of the thread-specific heaps during garbage collection. It should be understood, however, that other methods for implementing remembered sets are contemplated within the scope of the present invention. A garbage collecting operation 508 reclaims heap memory that is no longer being reachable.

Figure 6:
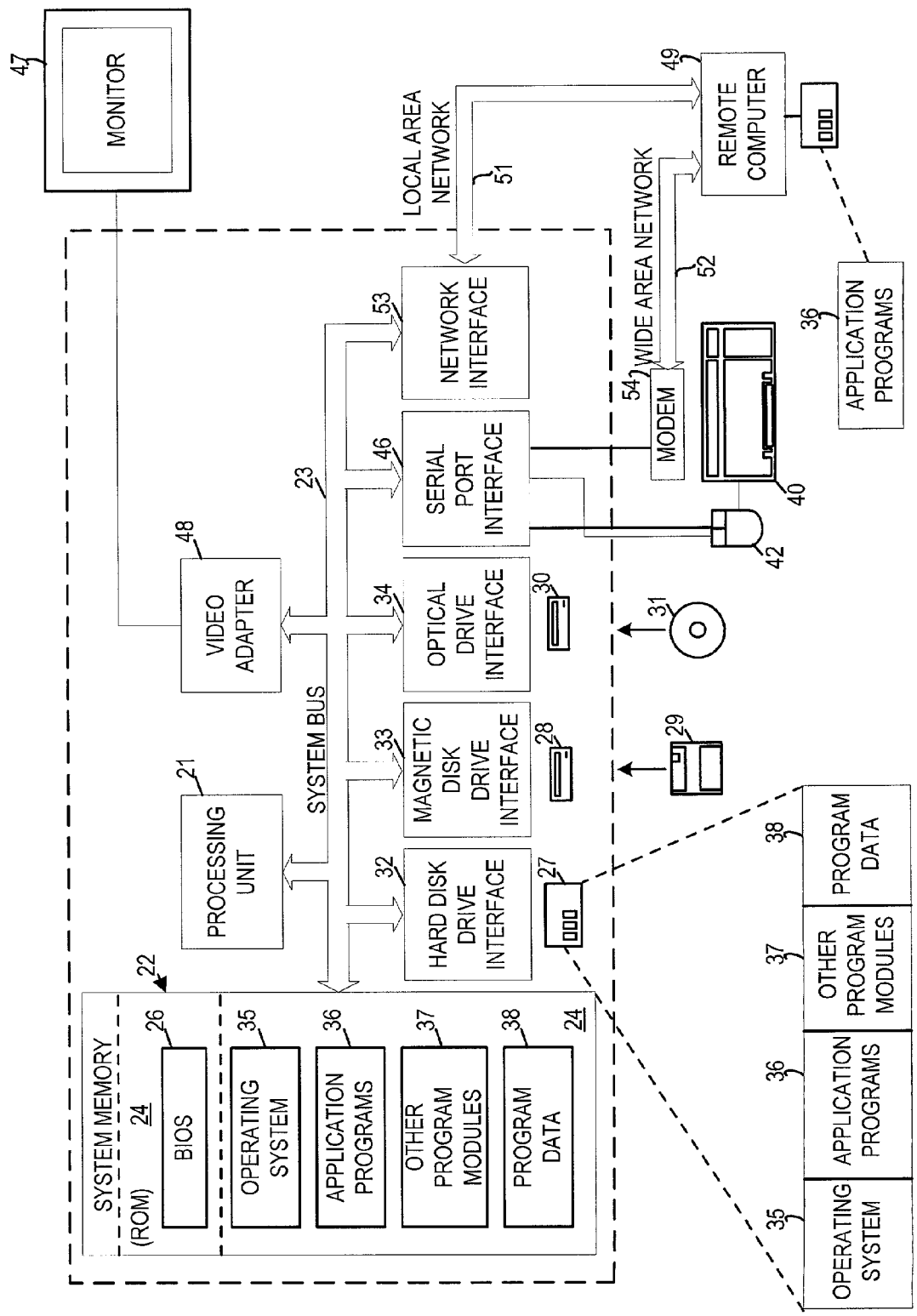
FIG. 6 illustrates an exemplary system useful for implementing an embodiment of the present invention.

The exemplary hardware and operating environment of FIG. 6 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an embodiment of the present invention, a program analyzer, a code specializer, a compiler, and a memory manager may be incorporated as part of the operating system 35, application programs 36, or other program modules 37. Metadata, remembered sets, and target programs may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A computer program product stored on at least one physical computer readable media and encoding a computer program for executing on a computer system a computer implemented method for managing allocation of program data in a target program between one or more thread-specific heaps and at least one shared heap, the program data including thread-specific data and shared data, the computer implemented method comprising:
   analyzing the target program during code compilation to distinguish among the proven thread-specific data of a first program thread, the proven thread-specific data of a second program thread, and the shared data, wherein program data in the target program is identified as the shared data, if the program data is referenced by the first program thread and the second program thread;
   configuring the target program to allocate the proven thread-specific data of the first program thread to a first thread-specific heap, responsive to the analyzing operation;
   configuring the target program to allocate the proven thread-specific data of the second program thread to a second thread-specific heap, responsive to the analyzing operation; and
   configuring the target program to allocate the shared data to the shared heap, responsive to the analyzing operation.

2. The computer program product of claim 1 wherein the analyzing operation comprises:
   identifying program data in the target program as the thread-specific data of the first program thread, if the program data is not referenced by any other program thread of the target program.

3. The computer program product of claim 1 wherein the analyzing operation comprises:
   identifying program data in the target program as the thread-specific data of the first program thread based on a thread escape analysis.

4. The computer program product of claim 1 wherein the analyzing operation occurs prior to execution of the target program.

5. The computer program product of claim 1 wherein the operation of configuring the target program to allocate the proven thread-specific data of the first program thread comprises:
   replacing an original allocation instruction in the target program with a new instruction that allocates the thread-specific data of the first program thread to the first thread-specific heap associated with the first program thread.

6. The computer program product of claim 1 wherein the operation of configuring the target program to allocate the proven thread-specific data of the first program thread comprises:
leaving an original allocation instruction in the target program to allocate the thread-specific data of the first program thread to the first thread-specific heap associated with the first program thread.

7. The computer program product of claim 1 wherein the operation of configuring the target program to allocate the shared data comprises:
leaving an original allocation instruction in the target program to allocate the shared data to the shared heap.

8. The computer program product of claim 1 wherein the operation of configuring the target program to allocate the shared data comprises:
replacing an original allocation instruction in the target program with a new instruction that allocates the shared data to the shared heap.

9. The computer program product of claim 1 wherein the operation of configuring the target program to allocate the proven thread-specific data of the first program thread comprises:
configuring an allocation parameter associated with the thread-specific data indicating that the thread-specific data of the first program thread is to be allocated in the one of the thread-specific heaps.

10. The computer program product of claim 1 wherein the operation of configuring the target program to allocate the proven thread-specific data of the first program thread further comprises:
allocating the thread-specific data of the first program thread to the first thread-specific heap associated with the first program thread, responsive to an allocation parameter.

11. The computer program product of claim 1 wherein the operation of configuring the target program to allocate the shared data comprises:
configuring an allocation parameter associated with the shared data indicating that the shared data is to be allocated in the shared heap.

12. The computer program product of claim 11 wherein the operation of configuring the target program to allocate the shared data further comprises:
allocating the shared data to the shared heap, responsive to the allocation parameter.

13. The computer program product of claim 1 wherein the operation of configuring the target program to allocate the proven thread-specific data of the first program thread occurs prior to execution of the target program.

14. The computer program product of claim 1 wherein the operation of configuring the target program to allocate the shared data occurs prior to execution of the target program.

15. The computer program of claim 1 wherein the computer implemented method further comprises:
garbage collecting the thread-specific data from the first thread-specific heap independently of garbage collection of the shared data in the shared heap.

16. The computer program of claim 1 wherein the computer implemented method further comprises:
garbage collecting the thread-specific data from the first thread-specific heap independently of garbage collection of the second thread-specific heap.

17. The computer program of claim 1 wherein the computer implemented method further comprises:
garbage collecting the thread-specific data from the first thread-specific heap independently of the execution of another program thread in the target program.

18. The computer program of claim 1 wherein the computer implemented method further comprises:
garbage collecting the shared data from the shared heap independently of garbage collection of the thread-specific data in the first thread-specific heap.

19. The computer program of claim 1 wherein the computer implemented method further comprises:
maintaining a remembered set identifying references to one or more shared data in the shared heap; and
collecting the shared heap independently of garbage collection of the first thread-specific heap.

20. The computer program product of claim 1 wherein the computer implemented method further comprises:
collecting a portion of the shared data from the shared heap to leave an uncollected portion of the shared data in the shared heap, the uncollected portion of the shared data including shared data that is referenced by thread-specific data of the first thread-specific heap that has not yet been scanned;
scanning the thread-specific data from the first thread-specific heap, responsive to the operation of collecting a portion of the shared data; and
collecting the uncollected portion of the shared data from the shared heap, responsive to the scanning operation.

21. The computer program product of claim 20 wherein the computer implemented method further comprises:
collecting the thread-specific data from the first thread-specific heap, responsive to the operation of collecting a portion of the shared data.

22. The computer program product of claim 1 wherein the shared heap is shared by a subset of the program threads of the target program, wherein the subset of program threads includes less than all of the program threads of the target program.

23. A method implemented at least in part by a computing device for allocating of program data in a target program between one or more thread-specific heaps and at least one shared heap, the program data including thread-specific data and shared data, the method comprising:
analyzing the target program during code compilation to distinguish between proven thread-specific data of a first program thread and the shared data, wherein program data in the target program is identified as the shared data, if the program data is referenced by the first program thread and a second program thread of the target program;
configuring the target program to allocate the proven thread-specific data of the first program thread to a first thread-specific heap, responsive to the analyzing operation, by replacing an original allocation instruction in the target program with a new instruction that allocates the thread-specific data of the first program thread to the first thread-specific heap associated with the first program thread; and
configuring the target program to allocate the shared data to the shared heap, responsive to the analyzing operation, by replacing an original allocation instruction in the target program with a new instruction that allocates the shared data to the shared heap.

24. The method of claim 23 further comprising:
collecting a portion of the shared data from the shared heap to leave an uncollected portion of the shared data in the shared heap, the uncollected portion of the shared data including shared data that is referenced by thread-specific data of the first thread-specific heap that has not yet been scanned;

scanning the thread-specific data from the first thread-specific heap, responsive to the operation of collecting a portion of the shared data; and collecting the uncollected portion of the shared data from the shared heap, responsive to the scanning operation.

25. The method of claim 24 further comprising:

collecting the thread-specific data from the first thread-specific heap, responsive to the operation of collecting a portion of the shared data.

26. The method of claim 23 wherein the operation of configuring the target program to allocate the thread-specific data comprises:

configuring an allocation parameter associated with the thread-specific data indicating that the thread-specific data of the first program thread is to be allocated in the first thread-specific heap.

27. A compiler implemented at least in part by a computing device for managing allocation of program data of a target program between a shared heap and a thread-specific heap, the program data including thread-specific data and shared data, the compiler comprising:

a program analyzer analyzing the target program during code compilation to distinguish between proven thread-specific data of a first program thread, proven thread-specific data of a second program thread, and the shared data, wherein program data in the target program is identified as the thread-specific data of the first program thread, if the program data is not referenced by any other program thread of the target program; and a code specializer configuring the target program to allocate the proven thread-specific data of the first program thread to a first thread-specific heap, configuring the target program to allocate the thread-specific data of the second program thread to a second thread-specific heap, and configuring the target program to allocate the shared data to the shared heap, responsive to the analyzing operation.

28. A computer program product stored on at least one physical computer readable media and encoding a computer program for executing on a computer system a computer implemented method for managing memory used for program data in a target program having one or more thread-specific heaps and at least one shared heap, the program data including thread-specific data and shared data, the computer implemented method comprising:

analyzing the target program during code compilation to distinguish between proven thread-specific data of a first program thread and the shared data;

allocating during target program code compilation the proven thread-specific data associated with a first program thread of the target program to a first thread-specific heap, the thread-specific data being determined to be reachable only by the first thread;

allocating during target program code compilation the shared data to the shared heap, the shared data being deemed potentially reachable by a plurality of the program threads of the target program;

garbage collecting the thread-specific data from the first thread-specific heap independently of garbage collection of the shared data in the shared heap; and garbage collecting the shared data from the shared heap independently of garbage collection of the thread-specific data in the first thread-specific heap.

29. The computer program of claim 28 wherein the computer implemented method further comprises:

garbage collecting the thread-specific data from the first thread-specific heap independently of the execution of another program thread in the target program.

30. The computer program of claim 28 wherein the computer implemented method further comprises:

maintaining a remembered set identifying references to one or more shared data in the shared heap; and collecting the shared heap independently of garbage collection of the first thread-specific heap, based on the references identified in the remembered set.

31. A method implemented at least in part by a computing device for managing memory used for program data in a target program having one or more thread-specific heaps and at least one shared heap, the program data including thread-specific data and shared data, the method comprising:

analyzing the target program during code compilation to distinguish between proven thread-specific data of a first program thread and the shared data;

allocating the proven thread-specific data associated with a first program thread of the target program during code compilation to a first thread-specific heap, the thread-specific data being determined to be reachable only by the first thread;

allocating the shared data to the shared heap during code compilation, the shared data being deemed potentially reachable by a plurality of the program threads of the target program;

garbage collecting the thread-specific data from the first thread-specific heap independently of the execution of another program thread in the target program; and garbage collecting the shared data from the shared heap independently of garbage collection of the thread-specific data in the first thread-specific heap.

32. The method of claim 31 further comprising:

garbage collecting the thread-specific data from the first thread-specific heap independently of garbage collection of the shared data in the shared heap.

33. The method of claim 31 further comprising:

maintaining a remembered set identifying references to one or more shared data in the shared heap; and collecting the shared heap independently of garbage collection of the first thread-specific heap, based on the remembered set.

34. The method of claim 31 further comprising:

collecting a portion of the shared data from the shared heap to leave an uncollected portion of the shared data in the shared heap, the uncollected portion of the shared data including shared data that is referenced by thread-specific data of the first thread-specific heap that has not yet been scanned;

scanning the thread-specific data from the first thread-specific heap, responsive to the operation of collecting a portion of the shared data; and collecting the uncollected portion of the shared data from the shared heap, responsive to the scanning operation.

35. The method of claim 34 further comprising:

collecting the thread-specific data from the first thread-specific heap, responsive to the operation of collecting a portion of the shared data.

36. A memory manager implemented at least in part by a computing device for managing heap memory in a computer system, the heap memory being used to store program data, the program data including thread-specific data and shared data, the memory manager comprising:
- a program analyzer analyzing the target program during code compilation to distinguish between proven thread-specific data of a first program thread and the shared data;
- an allocation module allocating the proven thread-specific data associated with the first program thread of the target program to a first thread-specific heap, the thread-specific data being determined to be reachable only by the first thread, and allocating the shared data to the shared heap, the shared data being deemed potentially reachable by a plurality of the program threads of the target program; and
- a garbage collector reclaiming memory associated with the thread-specific data from the first thread-specific heap independently of garbage collection of the shared data in the shared heap, and independently of the execution of another program thread in the target program.

37. The memory manager of claim 36 further comprising:
- a garbage collector reclaiming memory associated with the shared data from the shared heap independently of garbage collection of the thread-specific data in the first thread-specific heap.

38. The memory manager of claim 36 wherein the memory manager maintains a remembered set identifying references to one or more shared data in the shared heap and further comprising:
- a garbage collector reclaiming memory associated with the shared heap independently of garbage collection of the first thread-specific heap, based on the remembered set.

* * * * *